United States Patent [19]
Frary

[11] Patent Number: 6,081,857
[45] Date of Patent: Jun. 27, 2000

[54] SYSTEM AND METHOD FOR IDENTIFYING AND MANAGING DATA STORAGE VOLUMES USING ELECTROMAGNETIC TRANSDUCERS

[75] Inventor: James M. Frary, Louisville, Colo.

[73] Assignee: Storage Technology Corporation, Louisville, Colo.

[21] Appl. No.: 08/168,167

[22] Filed: Dec. 17, 1993

[51] Int. Cl.[7] .................................................. G06F 19/00
[52] U.S. Cl. .......................... 710/74; 710/106; 369/39; 395/99
[58] Field of Search ................................. 710/72, 73, 74, 710/100, 105, 106, 129; 342/51, 42, 43; 369/34, 36, 39; 395/88, 93, 99

[56] References Cited

U.S. PATENT DOCUMENTS

| | | | |
|---|---|---|---|
| 3,713,148 | 1/1973 | Cardullo et al. | 342/42 |
| 3,981,011 | 9/1976 | Bell, III | 343/6.5 LC |
| 4,364,043 | 12/1982 | Cole et al. | 340/825.54 |
| 4,517,563 | 5/1985 | Diamant | 340/825.54 |
| 4,730,188 | 3/1988 | Milheiser | 340/825 |
| 4,742,470 | 5/1988 | Juengel | 340/474.17 |
| 4,807,140 | 2/1989 | Saulnier | 364/468 |
| 4,827,395 | 5/1989 | Anders et al. | 364/138 |
| 4,888,473 | 12/1989 | Rossi et al. | 235/376 |
| 4,952,928 | 8/1990 | Carroll et al. | 340/825.54 |
| 4,990,756 | 2/1991 | Hoemann | 235/462 |
| 5,008,661 | 4/1991 | Raj | 340/825.54 |
| 5,124,699 | 6/1992 | Tervoert et al. | 340/825.54 |
| 5,159,332 | 10/1992 | Walton | 340/825.54 |
| 5,194,856 | 3/1993 | Zijlstra | 340/825.35 |
| 5,212,806 | 5/1993 | Natarajan | 455/33.2 |
| 5,231,273 | 7/1993 | Caswell et al. | 235/385 |
| 5,302,954 | 4/1994 | Brooks et al. | 342/44 |

OTHER PUBLICATIONS

Schroeder et al., "Improvement of the User Interface for Video Cassette Recorders by 'Memory–In–Cassette'", *IEEE Transactions on Computer Electronics*, vol. 39, No. 3, Aug., 1993, pp. 320–324.

*Primary Examiner*—Viet D. Vu
*Attorney, Agent, or Firm*—Sterne, Kessler, Goldstein & Fox P.L.L.C.

[57] ABSTRACT

A system for identifying and managing information stored in a plurality of physical volumes (e.g., tape cartridges) in an information storage system includes a plurality of labels. Each label is configured for physical attachment to a physical volume and includes an electromagnetic transponder for storing data associated with the physical volume and/or the information contained therein. The electromagnetic transponder is non-volatile, re-writable, and readable without requiring physical contact with the label. The system includes a robotic hand assembly for manipulating the physical volumes. Fine positioning of the robotic hand assembly with respect to the physical volume is done based on a signal returned from the electromagnetic transponder.

2 Claims, 5 Drawing Sheets

SYSTEM AND METHOD FOR IDENTIFYING AND MANAGING DATA STORAGE VOLUMES USING ELECTROMAGNETIC TRANSDUCERS

RELATED APPLICATION

This application is related to a commonly owned application entitled "High Data Density Label and System Using Same," filed on even date herewith, the full disclosure of which is incorporated herein by reference as if reproduced in full below.

BACKGROUND OF THE INVENTION

1. Field of the Invention

The present invention relates generally to data storage, and more specifically, to a system for identifying and managing a plurality of physical volumes, as well as the information stored thereon, in an information storage system.

2. Related Art

The data processing industry stores large amounts of digital data on magnetic tapes, magnetic disks, optical disks, semiconductor memories, and the like. These devices, generally referred to herein as physical volumes, may be implemented for example in the form of cassettes, cartridges, disk packs, or memory modules. The 3480 tape cartridge (developed by IBM Corporation, Armonk, N.Y.) is an example of an industry standard for magnetic storage media. The 3480 cartridge is a single-reel cartridge which houses a length of one-half inch wide magnetic tape.

Conventionally, a pre-printed label adhered directly to the physical volume has been used to identify the volume. Variable alpha-numerical sequences such as serial or identification numbers are used to distinguish a plurality of physical volumes. Machine-readable variable patterns such as bar codes on the labels are used for the same purpose.

Because the data stored in each physical volume is changeable, it is desirable to keep a record of its contents. Such records are frequently maintained in a computer system. Whenever specific information about the physical volume or the data stored therein is required, manual or automated apparatus "read" the identification label and feed this information to the computer system. The computer system then matches a stored data record with the physical volume.

The StorageTek Model 4410 Automated Cartridge System (ACS), available from Storage Technology Corporation, Louisville, Colo., uses such a process. The ACS includes automated apparatus to read identification labels on tape cartridges. The identification labels include a bar coded identification number. A look-up table in a host computer provides a cross-reference between the identification number and information pertaining to the contents of the tape cartridge.

In recent years, this look-up table approach has been complicated by the need to make data accessible to more than a single computer system. This may occur, for example, when a volume is shipped to another geographic location or the media drive is part of a network of multiple central processors. In these circumstances, the traditional, single look-up table is not practical. Further, using multiple, distributed look-tables would also be untenable in the dynamic environment of data storage where table coherency would be essential. Manual handling of physical volumes further complicates the task of data management since the physical volumes and associated data can experience even greater, untraceable manipulations through human intervention.

It is desirable to keep a summary of the contents of each physical volume attached directly to the physical volume. This will allow the identification data to be read and updated at any stage of handling and use. In the case of data cartridges, this has been done in the past by writing a summary in digital form on the medium in the cartridge. However, in order to access this summary, the tape cartridge must be loaded into a tape drive and the tape searched for the summary data. This is a time consuming process, especially when a number of tapes are searched for specific data.

It is desirable to improve the integrity and efficiency of the present physical volume and data management systems.

SUMMARY OF THE INVENTION

The invention is a system for identifying and managing information stored in a plurality of physical volumes (e.g., data cartridges) in an information storage system. The information storage system may be a manual system or an automated system such as the Storage Technology Corporation Model 4400 ACS. The system of the invention includes a plurality of data labels. Each label is configured for physical attachment to a physical volume. Each label includes an electromagnetic transponder device for storing data associated with the physical volume and/or the information contained therein.

The transponder includes a non-volatile memory which is re-writable for the storage of metadata. Metadata may include such information as a directory of data files stored in the physical volume, a log of media defects and errors, media manufacturing and format history, history of media usage, ownership, security access codes, and any other piece of information which an information management system might use to enhance the performance and reliability of the system.

The system further includes a transceiver for reading the metadata from the label without requiring physical contact between the transceiver and the label. A transceiver is also used to modify or write data in the label without requiring physical contact with the label.

In the preferred embodiment, the system of the invention is implemented in an ACS. The ACS includes a plurality of physical volume storage locations and a transfer means for moving the physical volumes from the storage locations to use locations. The transfer means includes a robotic arm assembly. The use location is generally a tape drive. The robot is configured to retrieve a cartridge from a storage location and to place the cartridge in the drive for read/write operations.

A transceiver is attached to the robotic arm so that when the robotic arm is positioned to retrieve a selected cartridge, the transceiver is positioned adjacent to the label on the selected cartridge. A transceiver may also be coupled to a tape drive so that the data in a label may be modified in conjunction with modification of the data stored in the cartridge.

The foregoing and other objects, features and advantages of the invention will be apparent from the following, more particular description of a preferred embodiment of the invention, as illustrated in the accompanying drawings.

DESCRIPTION OF THE PREFERRED EMBODIMENT

The preferred embodiment of the invention is discussed in detail below. While specific part numbers and configurations are discussed, it should be understood that this is done for illustration purposes only. A person skilled in the relevant art will recognize that other components and configurations may be used without parting from the spirit and scope of the invention.

The preferred embodiment of the invention is now described with reference to the figures where like reference numbers indicate like elements. Also in the figures, the left most digits of each reference number corresponds to the figure in which the reference number is first used.

The invention is described in the environment of a Storage Technology Corporation model 4400 automated cartridge system or ACS. The label, however, may be used with any physical volume management system whether manual or automated. As used herein, the term "physical volume" refers to any data storage product (e.g., magnetic tape cartridge or cassette, magnetic disk, optical tape, optical disk, semiconductor memory module, etc.).

Figure 1:
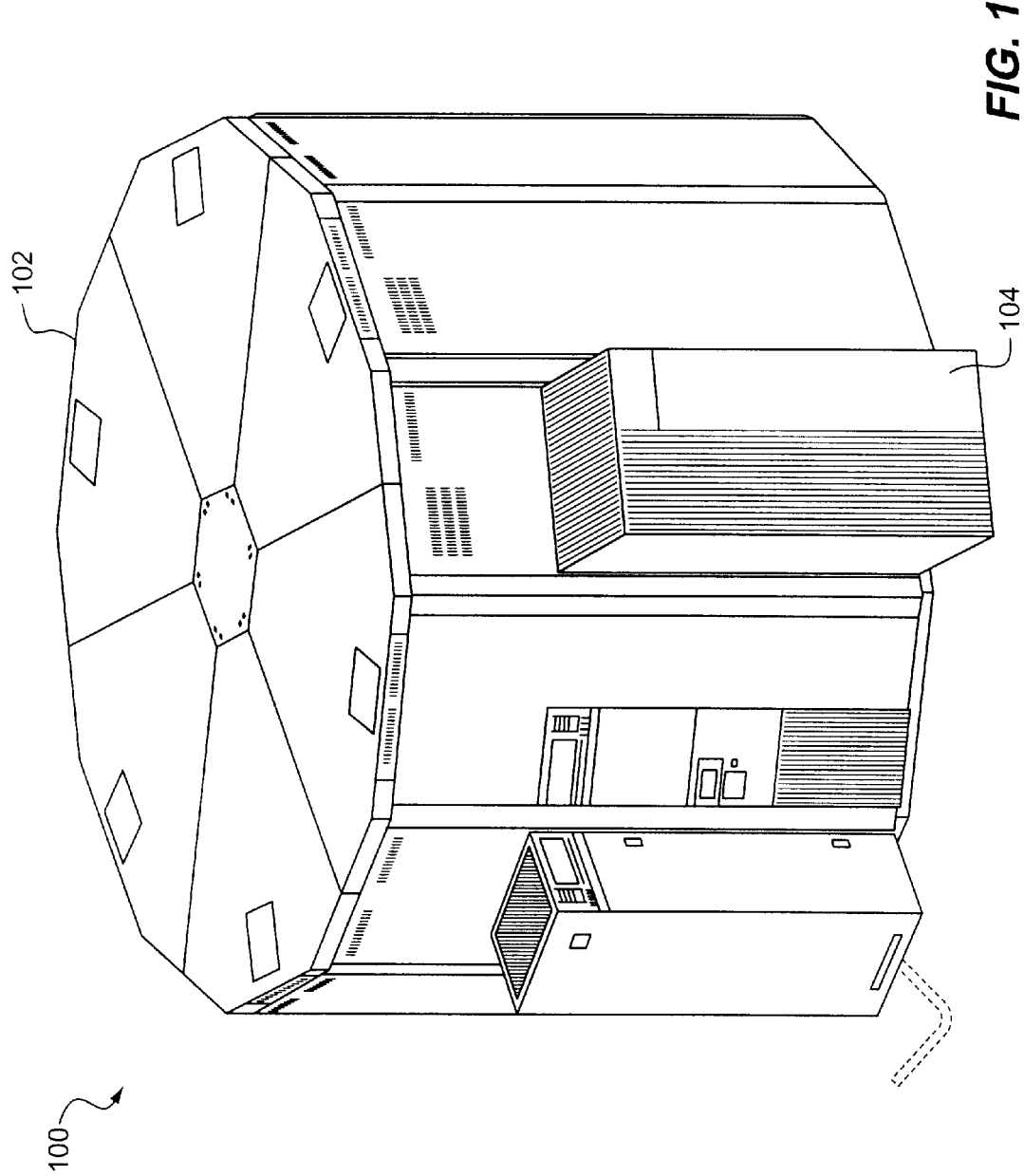
FIG. 1 illustrates the housing of the Storage Technology Corporation Model 4400 automated cartridge system.
Figure 2:
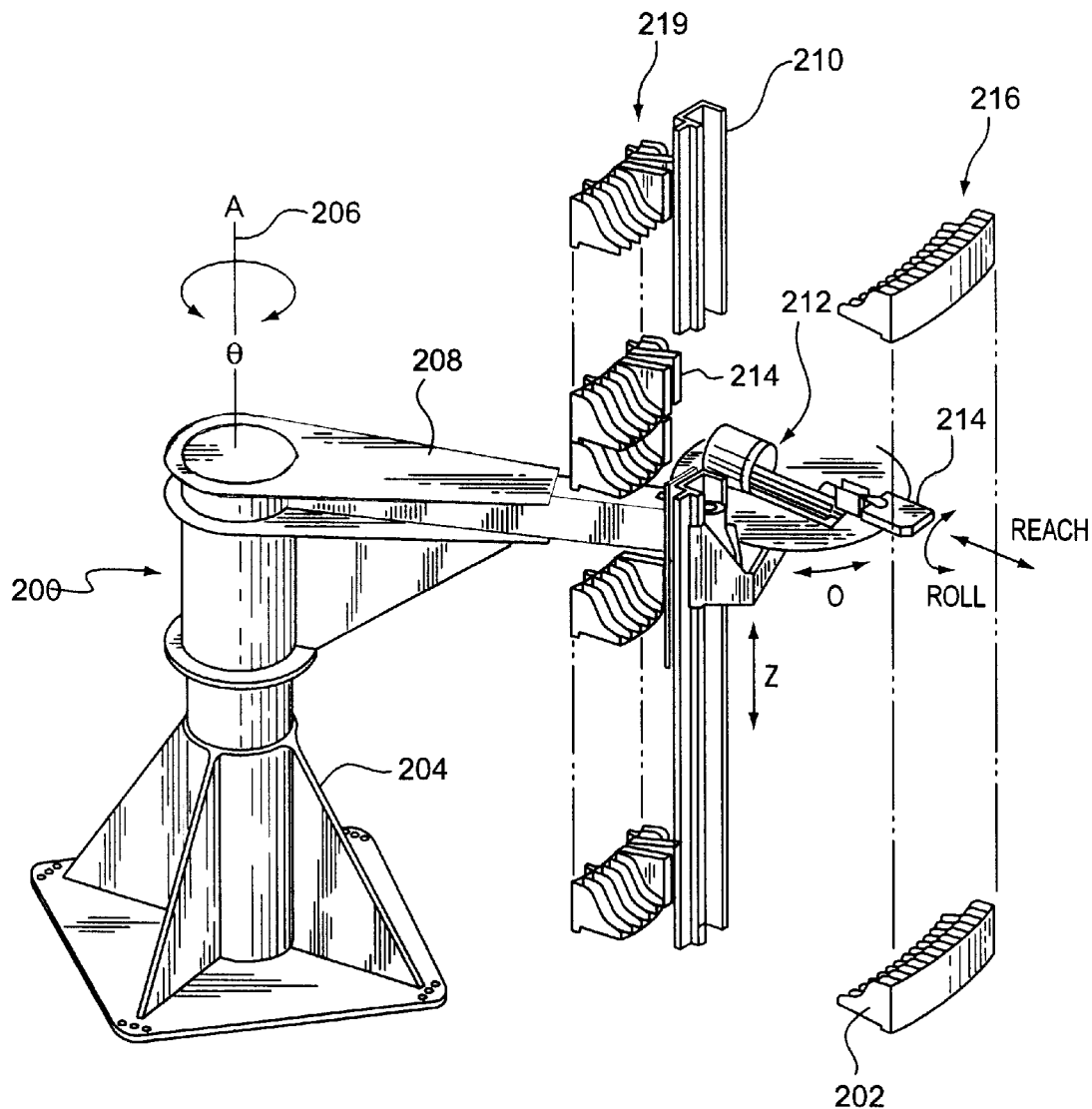
FIG. 2 illustrates the robot assembly and cartridge storage bins for the Storage Technology Corporation Model 4400 automated cartridge system.

FIGS. 1 and 2 illustrate an ACS 100. ACS 100 includes a housing 102. A tape drive 104 is coupled to a side of housing 102. FIG. 2 illustrates a robot assembly 200 and a plurality of cartridge storage bins 202 which are disposed within housing 102.

Robot 200 is positioned in the center of housing 102 and includes a base portion 204 defining a vertical axis of rotation 206. A theta arm 208 rotates about axis 206. A vertically disposed Z arm 210 is coupled to a distal end of theta arm 208. A robotic hand assembly 212 is coupled for vertical movement along Z arm 210. Robotic hand assembly 212 is configured to retrieve a tape cartridge 214 from a storage bin 202 and to deliver cartridge 214 to tape drive 104.

A first plurality 216 of bins 202 are arranged around the inner wall of housing 102. A second plurality 218 of bins 202 are arranged in a circular configuration inward from and concentric with the first plurality 216 of bins 202. Robotic hand assembly 212 may pivot to reach a cartridge in any bin 202. An example of a Storage Technology Corporation ACS is described in U.S. Pat. Nos. 4,864,511, 4,928,245, and 4,932,826 to Moy et al., which are incorporated herein by reference.

In the conventional ACS 100, robot assembly 200 includes a camera-and-light assembly which identifies a cartridge by a bar-coded label attached thereto. The present invention replaces or supplements the bar code system with an EMT (ElectroMagnetic Transponder) label system. The EMT label system includes a plurality of data labels. Each label is configured for physical attachment to or integration into a cartridge (or other physical volume). Each label includes an electromagnetic transponder for storing data associated with the cartridge and/or the information contained therein. The transponder includes a non-volatile, and preferably, re-writable memory.

The data stored in the memory of the label is referred to as "metadata." Metadata may include such information as a directory of data files stored in the physical volume, a log of media defects and errors, media manufacturing and format history, history of media usage, ownership, security access codes, and any other piece of information which a storage management system might use to enhance the performance and reliability of the system.

Figure 3:
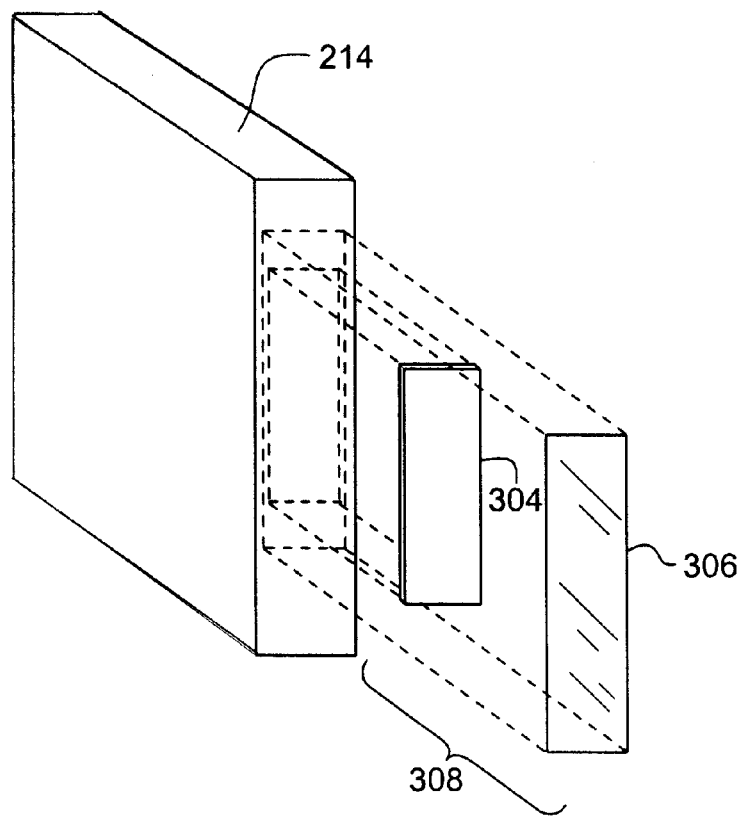
FIG. 3 illustrates assembly of a tape cartridge and a label in accordance with the invention.

FIG. 3 shows a sample data cartridge 214. A standard adhesive-type label portion 306 is configured for attachment to an end of cartridge 214. Label portion 306 may have human-readable and/or machine-readable information imprinted on its outer surface. For example, label portion 306 may be a conventional label including an alphanumeric code and a bar code. An electromagnetic transponder 304 is disposed between label portion 306 and cartridge 214. The combination of label portion 306 and transponder 304 forms an EMT label 308.

Alternatively, label portion 306 and transponder 304 may be produced in a single integral label. For example, label portion 306 may be printed directly on transponder 304. Moreover, transponder 304 need not be directly coupled to label portion 306. For example, in other embodiments, transponder 304 may be integrated into or positioned within cartridge 214 while label portion 306 is attached to the outer surface of the cartridge as shown in FIG. 3.

Label portion 306 may be similar to the conventional label and include bar-coded and human readable information. This will facilitate backward compatibility of the label of the invention with existing systems. In an alternate embodiment, however, label portion 306 may be omitted all together such that EMT label 308 comprises only transducer 304. The term "label" as used hereinafter shall refer to label 308 including transponder 304 but not necessarily including label portion 306.

EMT technology uses an incident electromagnetic field from a transceiver to induce power generation in an antenna of a (normally passive) transponder. This power enables an active semiconductor device within the transponder to modulate the incident field with information (the metadata) stored in a memory of the transponder and to then retransmit the signal back to the transceiver. This is the same physical phenomenon employed in radio frequency identification or RFID technology.

Figure 4:
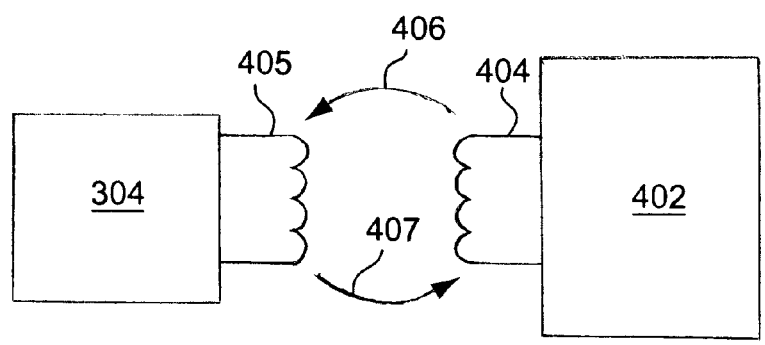
FIG. 4 is a block diagram illustrating operation of an electromagnetic transponder.

FIG. 4 illustrates operation of transponder 304. An EMT transceiver is used to read data from transponder 304. An electromagnetic signal 406 is transmitted from an antenna 404 of transceiver 402 and is received by an antenna 405 of EMT transponder 304. Transponder 304 then modulates signal 406 with data stored in a memory (e.g., an electrically erasable, programmable, read-only memory, or EEPROM) of transponder 304. The modulated signal, including the data from transponder 304, is then broadcast from antenna 405 as a data signal 407. Data signal 407 is received by antenna 404 of read transceiver 402.

In this manner, data stored within transponder 304 is "read" by EMT read transceiver 402. The reading is done without requiring physical contact between transceiver 402 and transponder 304. Only electromagnetic (or electrostatic)

coupling between transceiver 402 and transponder 304 occurs. As used herein, the terms "electromagnetic transponder" or "EMT" includes both electromagnetic and electrostatic transponder technologies. Moreover, the EMT devices may be implemented in any frequency range using technologies from radio frequency through microwave frequencies and up to free space optical frequencies. It may also be possible to implement the EMT devices using sonic (ultrasound) signal transmission rather than electromagnetic signal transmission. These technologies are well known in the art. Furthermore, a variety of ways for implementing transponder 304 and read transceiver 402 will be apparent to a person skilled in the relevant art.

Figure 5:
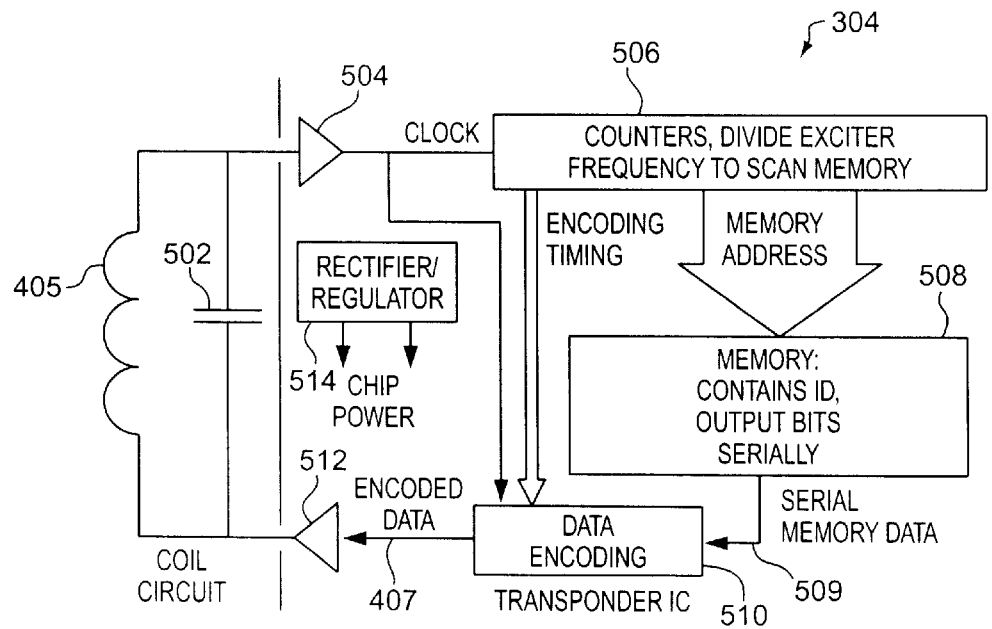
FIG. 5 is a block diagram of a read-only embodiment of a transponder.

FIG. 5 illustrates an example implementation of transponder 304. In this example, transponder 304 is a passive transponder (i.e., transponder 304 has no power source of its own). Note however that transponder 304 may also be an active transponder. Transponder 304 includes antenna 405, a filter capacitor 502, an input buffer 504, a counter circuit 506, a memory 508, an encoding circuit 510, an output buffer 512, and a power circuit 514. Antenna 405 receives an excitation signal 406 from a transceiver 402. A portion of the energy from signal 406 is used by power circuit 514 to generate power for the active components of transponder 304. Counter 506 receives signal 406 via input buffer 504 and produces a memory address to memory 508.

In response to the memory address, memory 508 outputs a data signal (metadata) 509 to encoding circuit 510. Encoding circuit 510 outputs an encoded data signal 407 to antenna 405 through output buffer 512. The encoded data signal 407 is then transmitted by antenna 405 for receipt by transceiver 402. This is an example of full duplex mode of operation. Note that excitation signal 406 and encoded data signal 407 are simultaneously present on antenna 405.

Figure 6:
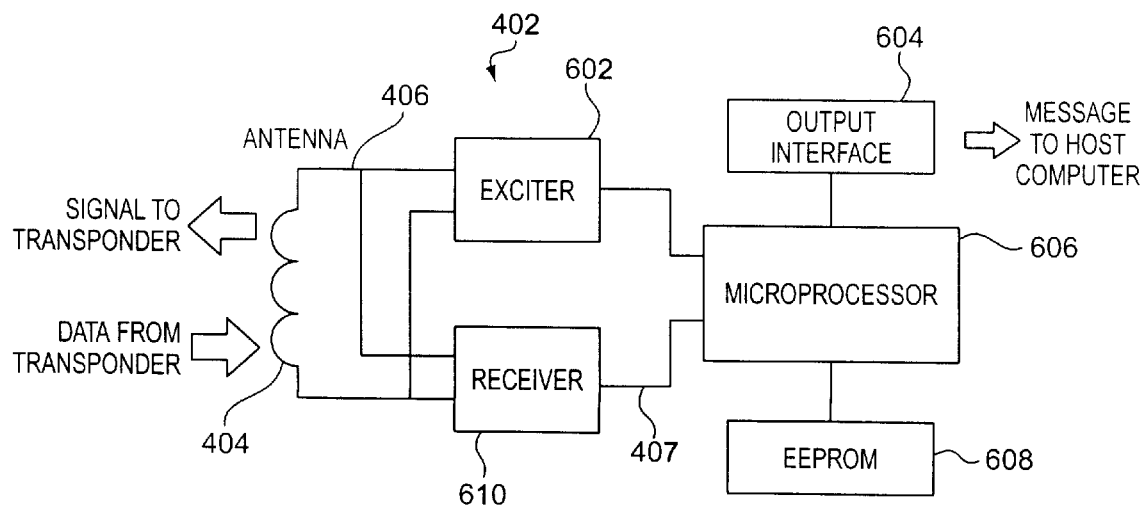
FIG. 6 is a block diagram of a read-only embodiment of a transceiver.

FIG. 6 illustrates an example implementation of transceiver 402. Transceiver 402 includes antenna 404, an exciter circuit 602, an output interface circuit 604, a microprocessor circuit 606, a memory 608, and a receiver 610. Exciter 602 produces excitation signal 406 for transmission by antenna 404. Receiver 610 receives signal 407 from transponder 304. Since signals 406 and 407 are simultaneously present on antenna 404, receiver 610 also receives excitation signal 406 directly from exciter circuit 602 and subtracts excitation signal 406 from the combined signal on antenna 404 to produce the data signal 407.

Microprocessor circuit 606 control operation of exciter circuit 602 and receives data signal 407 from receiver 610. Data signal 407 may then be stored in memory circuit 608. Output interface 604 allows data signal 407 to be output to a host computer or other system.

The examples of transponder 304 and transceiver 402 discussed above are read-only devices. The devices were selected for illustration of the principles of the EMT technology and for ease of discussion. In the preferred embodiment, however, the devices will be implemented using read/write technology. For writing data, transceiver 402 and transponder 304 operate in a manner substantially similar to when data is being read. For writing data to transponder 304, signal 406 will be modulated with a data signal. The data will then be extracted from the underlying carrier signal using a receiver circuit and will be stored in memory 508 of transponder 304. Configuration and operation of a re-writable transponder and a read/write transceiver will be apparent to a person skilled in the relevant art.

Figure 7:
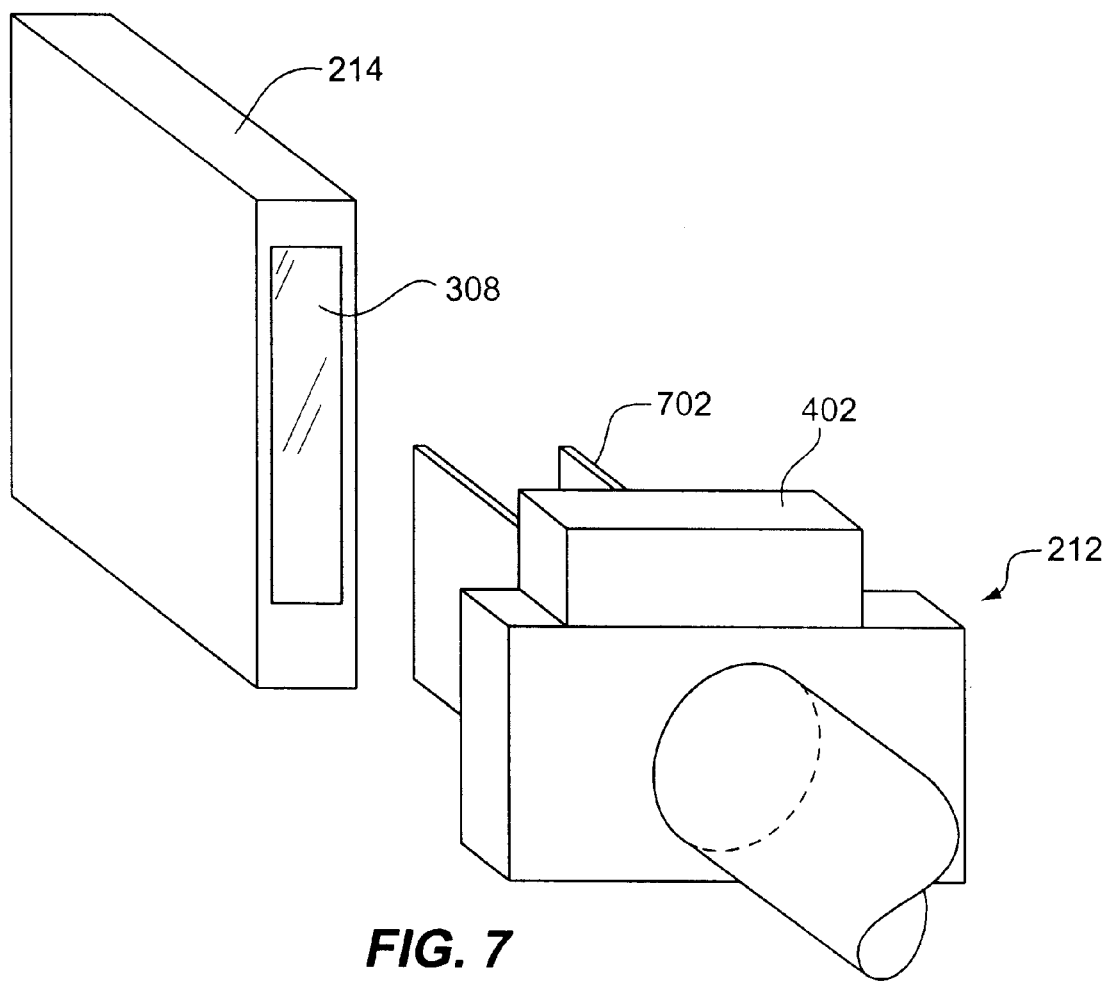
FIG. 7 is a perspective view of a robotic hand assembly having an electromagnetic transceiver mounted thereon in accordance with a preferred embodiment of the invention.

FIG. 7 illustrates an implementation of transceiver 402 in the environment of robotic hand assembly 212. Robotic hand assembly 212 includes a gripper hand 702 for grabbing tape cartridge 214. Transceiver 402 is positioned adjacent gripper hand 602 to allow transceiver 402 to read label 308 when gripper hand 702 is aligned with cartridge 214. Note that actual contact between gripper hand 702 and cartridge 214 is not required for interrogation of label 308.

The beam of energy transmitted by read transceiver 402 is a narrow beam of electromagnetic energy. The narrow beam allows read transceiver 402 to discriminate between closely adjacent labels of closely adjacent cartridges 214 within ACS 100. Other features provided by the narrow beam of electromagnetic energy include the ability to sense whether a cartridge is present by the presence or absence of a response to interrogating signal 406. Further, a signal (e.g., data signal 407) returned from label 308 may be used to fine-tune the positioning of gripper hand 702 with respect to cartridge 214. To accomplish this, means may be provided in transceiver 402 for determining attributes (e.g., amplitude, frequency, phase) of the signal. For example, alignment of gripper hand 702 with cartridge 214 may be correlated with receipt of maximum signal power from transponder 304.

In the preferred embodiment, read transceiver 402 is configured to interrogate a label 308 at a spacing of approximately 4.75 inches. Interrogating signal 506 has a beam width sufficiently narrow to discriminate between a plurality of transponders 304 which are arrayed on approximately 1.5-inch centers horizontally and 4.5-inch centers vertically within ACS 100. Transponder 304 contains a non-volatile read/write semiconductor memory (e.g., EEPROM) having at least one kilobyte capacity. Transfer of data between transponder 304 and transceiver 402 takes place at a rate greater than or equal to one megabyte per second. Transceiver 402 provides a bidirectional, eight-bit parallel input/output port (output interface 604) for communication with a processor/controller of ACS 100.

EMT technology is well known in the art. For example, suitable transponders 304, read transceiver 402 and write transceiver 404 are generally available from Hughes Identification Devices, Boulder, Colo. The particular EMT devices used will depend on the particular application. Off-the-shelf EMT components may be available for some applications. Other applications may require custom designed components.

The preferred embodiment has been described with transceiver 402 present on robotic hand assembly 212. Many alternate embodiments may be envisioned. For example, read transceiver 402 may be located farther away from gripper hand 702, with only antenna 404 of transceiver 402 being positioned proximate to labels 308. Similarly, transponder 304 may be positioned anywhere within or on the surface of cartridge 214.

Further more, it is desirable in the preferred embodiment that a transceiver 402 also be provided on each media drive. This will allow the data in a transponder to be read and/or modified in conjunction with read/write operations to the tape media.

The preferred embodiment of the invention has been described in the environment of an ACS 100. The invention, however, will also find application in a manual information management system. For example, transceiver 402 may be incorporated into a hand-held wand.

While the invention has been particularly shown and described with reference to several preferred embodiments thereof, it will be understood by those skilled in the art that various changes in form and details may be made therein without departing from the spirit and scope of the invention as defined in the appended claims.

What is claimed is:

1. In an automated physical volume system, a method for aligning a robotic hand assembly with a selected physical volume, the method comprising the steps of:

coarsely positioning the robotic hand assembly adjacent the selected physical volume, wherein the selected physical volume includes an electromagnetic transponder having a non-volatile memory configured to store data associated with the selected physical volume, and wherein the robotic hand assembly includes transceiver means for electromagnetically reading said data from said transponder without requiring physical contact with the selected physical volume;

transmitting an electromagnetic signal from said transceiver toward said electromagnetic transponder;

receiving a return signal from said electromagnetic transponder at said transceiver; and adjusting the relative positioning of the robotic hand assembly and the selected physical volume based on said return signal from said electromagnetic transponder.

2. The method of claim 1, wherein said step of adjusting further comprises the step of:

adjusting the relative positioning of the robotic hand assembly and the selected physical volume to maximize a magnitude of said return signal received at said transceiver means.

\* \* \* \* \*